No. 641,531. Patented Jan. 16, 1900.
W. P. MURPHY.
COMB.
(Application filed May 1, 1899.)
(No Model.) 2 Sheets—Sheet 1.

Witnesses
C. A. Plotner
M. N. Harmes

Inventor
William P. Murphy.
By his Attorneys
E. G. Murdock & Co.

THE NORRIS PETERS CO., PHOTO-LITHO., WASHINGTON, D. C.

No. 641,531. Patented Jan. 16, 1900.
W. P. MURPHY.
COMB.
(Application filed May 1, 1899.)
(No Model.) 2 Sheets—Sheet 2.

Witnesses
C. A. Plotner
M. H. Harms

Inventor
William P. Murphy.
By his Attorneys
E. F. Murdock & Co.

UNITED STATES PATENT OFFICE.

WILLIAM P. MURPHY, OF SAN JOSÉ, CALIFORNIA, ASSIGNOR OF ONE-HALF TO ALBERT E. WINLOW, OF SAME PLACE.

COMB.

SPECIFICATION forming part of Letters Patent No. 641,531, dated January 16, 1900.

Application filed May 1, 1899. Serial No. 715,195. (No model.)

*To all whom it may concern:*

Be it known that I, WILLIAM P. MURPHY, a citizen of the United States, residing at San José, in the county of Santa Clara and State of California, have invented certain new and useful Improvements in Combs; and I do hereby declare the following to be a full, clear, and exact description of said invention, such as will enable others skilled in the art to which it most nearly appertains to make, use, and practice the same.

This invention relates to improvements in combs, and more particularly to combs of the class known as "pocket-combs."

Figure 1:
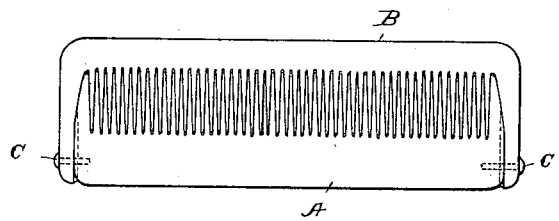
Figure 2:
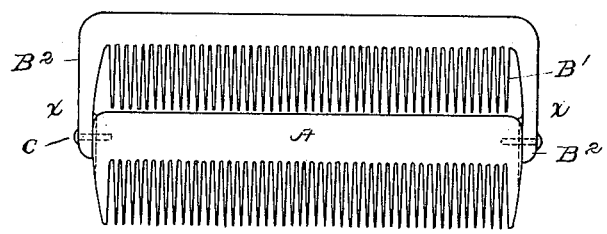
Figure 3:
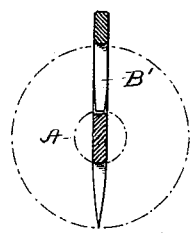
Figure 4:
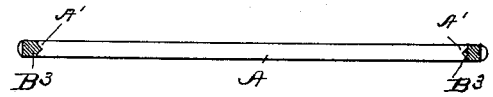
Figure 5:
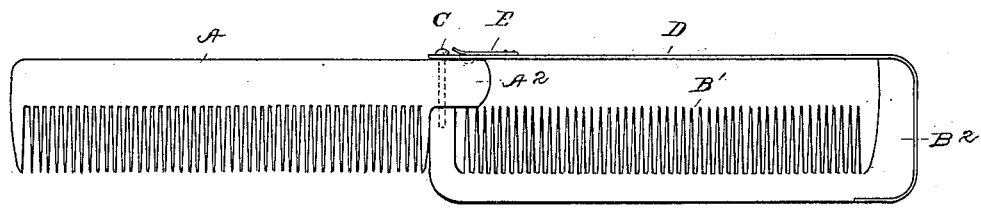
Figure 6:
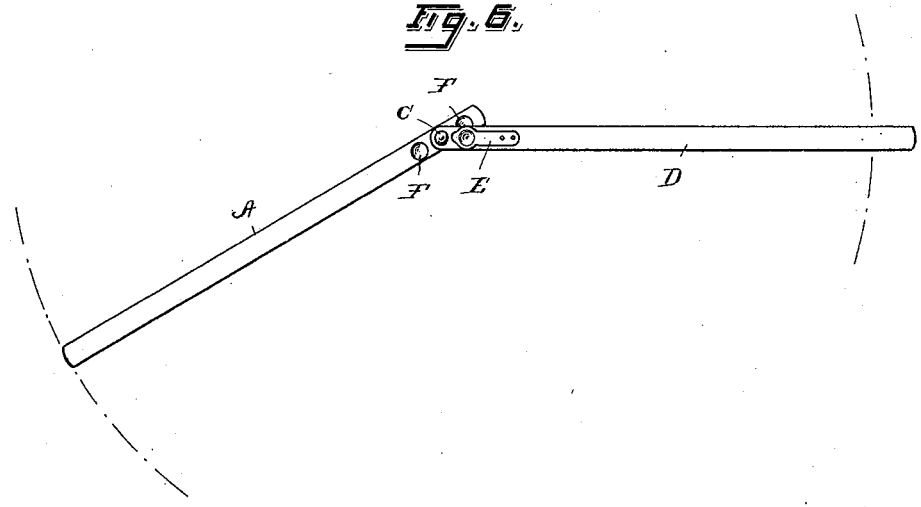

In the drawings, Figure 1 is a side elevation of a comb constructed in accordance with this invention shown in closed position. Fig. 2 is a side elevation of the same, showing it in a position to be used. Fig. 3 is a cross-section of the same as shown in Fig. 2. The broken lines shown in this drawing indicate the path of movement of the points of the teeth and cleaning-bars. Fig. 4 is a top view of the comb, showing in section on the lines $x\ x$ in Fig. 2 the end arms of the cleaning-bars. Fig. 5 is a side elevation, shown in an opened position, of an alternative view of the invention. Fig. 6 is a top view of the same, showing the two parts in the opened position, but out of line.

The object which the present invention has in view is to provide a comb of the character specified with suitable means whereby the comb is prevented from picking up dirt from the pocket when carried therein and also from permitting an accumulation of dirt in the comb by neglect.

With this object in view the invention consists in providing a companion part or filling portion which is pivotally connected to the comb in such a manner as to fill or occupy entirely the spaces between the teeth of the comb.

It further consists in providing suitable retaining devices for retaining the comb and filling portion in either a closed or open position.

To facilitate the description of the invention with reference to the drawings, I will designate the comb by the letter A. This comb may be of any ordinary construction, but is shown in the drawings in the preferred shape, being what is styled a "pocket-comb." It is pivotally connected to the back or filler B by means of the small pivots or pins C.

The filler B is provided with a number of tooth-like extensions B'. These are constructed to fill or fit between the teeth of the comb snugly, so that when the comb is folded upon the filler, as shown in Fig. 1 of the drawings, the spaces between the teeth are entirely filled to prevent the accumulation of dirt which may be in the pocket. Also the tooth-like extensions B' are constructed to fit close enough to scrape against the sides of the teeth as they enter the spaces left for them between the extensions B'. In this manner all such matter as dandruff or any other substance which adheres to the comb, as grease or pomatum, is removed from the sides of the teeth or at least prevented from accumulating thereon.

The arms or ends $B^2$ of the filler B are provided at the bottom with the slight V-shaped extensions $B^3$. These are adapted to fit within the grooves A', provided in the end of the comb A. There is spring enough in the material of which the filler B is composed to permit a slight expansion of the ends $B^2$ while the comb is being turned from either the opened or closed position. When it has arrived in either position, however, the contraction of the ends $B^2$ will force the V-like projections $B^3$ into the slots or grooves prepared in the ends to receive them, and the comb is locked in position against accidental collapsing.

In Figs. 5 and 6 there is shown an alternative construction of the invention, as herein described. The alternative consists in providing instead of the pivotal construction described, and shown in Figs. 1 to 4, that of an end pivotal construction, or, in other words, the pivot being provided in the end of one of the arms $B^2$. To the construction first described there is here added the brace D, which extends from one of the ends $B^2$ forward and rests upon the back of the end $A^2$ of the comb A. This brace also carries the pivot C, upon which the comb is turned into and out of engagement with the tooth-like extensions B' of the filler B. In these figures is also shown the alternative view of the locking device for holding the comb in its folded or bent position against accidental disarrangement. This consists in the small spring E, the end of which extends through the perforation in the brace D, to which the brace is secured.

Upon the back of the comb A are two small indentations F F, which come under the projections on the end of the spring E when the comb is opened or closed.

Having thus described this invention, what is claimed is—

1. In an article of the character specified, the combination of a receptacle for the comb having extensions adapted to fill the spaces between the teeth of the comb; and a pivotal connection between the receptacle and comb whereby revolution of the comb on the pivot would cause the teeth of the comb to pass between the said extensions of the receptacle, substantially as described.

2. In an article of the character specified, the combination; of a skeleton, or open receptacle pivotally attached to the back of the comb and having extensions adapted to fill the spaces between the teeth of the comb when the same are rotated past the said extensions, substantially as described.

In testimony whereof I have hereunto set my hand this 14th day of April, 1899.

WILLIAM P. MURPHY.

Witnesses:
W. C. KENNEDY,
H. A. BLANCHARD.